United States Patent [19]

Scott

[11] 4,187,612
[45] Feb. 12, 1980

[54] HEIGHT GAGE

[75] Inventor: Ian M. Scott, East Greenwich, R.I.

[73] Assignee: Brown & Sharpe Manufacturing Company, North Kingstown, R.I.

[21] Appl. No.: 941,568

[22] Filed: Sep. 12, 1978

[51] Int. Cl.² .............................................. G01B 7/02
[52] U.S. Cl. ............................... 33/172 E; 308/4 R
[58] Field of Search .................. 33/169 R, 170, 172 R, 33/172 B, 172 E, 125 C, 125 M; 308/4 R

[56] References Cited

U.S. PATENT DOCUMENTS

| 2,541,535 | 2/1951 | Neff ..................... 33/169 R |
| 2,841,876 | 7/1958 | Pittenger ................. 33/170 |
| 3,924,337 | 12/1975 | Taylor ................. 33/169 R |
| 3,996,669 | 12/1976 | Anichini ............... 33/172 E |

FOREIGN PATENT DOCUMENTS

| 76699 | 6/1918 | Switzerland ................. 33/170 |
| 83068 | 4/1920 | Switzerland ................ 33/169 R |
| 303313 | 2/1955 | Switzerland ................ 33/169 R |
| 878103 | 9/1961 | United Kingdom ............ 33/172 R |

*Primary Examiner*—Richard R. Stearns
*Attorney, Agent, or Firm*—Barlow & Barlow

[57] ABSTRACT

A height gage is disclosed including a vertical column of circular cross section with a carriage that rides up and down the column. The carriage is maintained in fixed radial position relative to the column by a longitudinal groove in the column into which a longitudinal surface is formed that extends accurately on a radius of the column throughout the length of the column. A shoe which is mounted on the carriage engages this vertical surface and maintains the carriage always in proper alignment. Means are also provided on the column and the carriage to measure the position of the carriage on the column.

7 Claims, 4 Drawing Figures

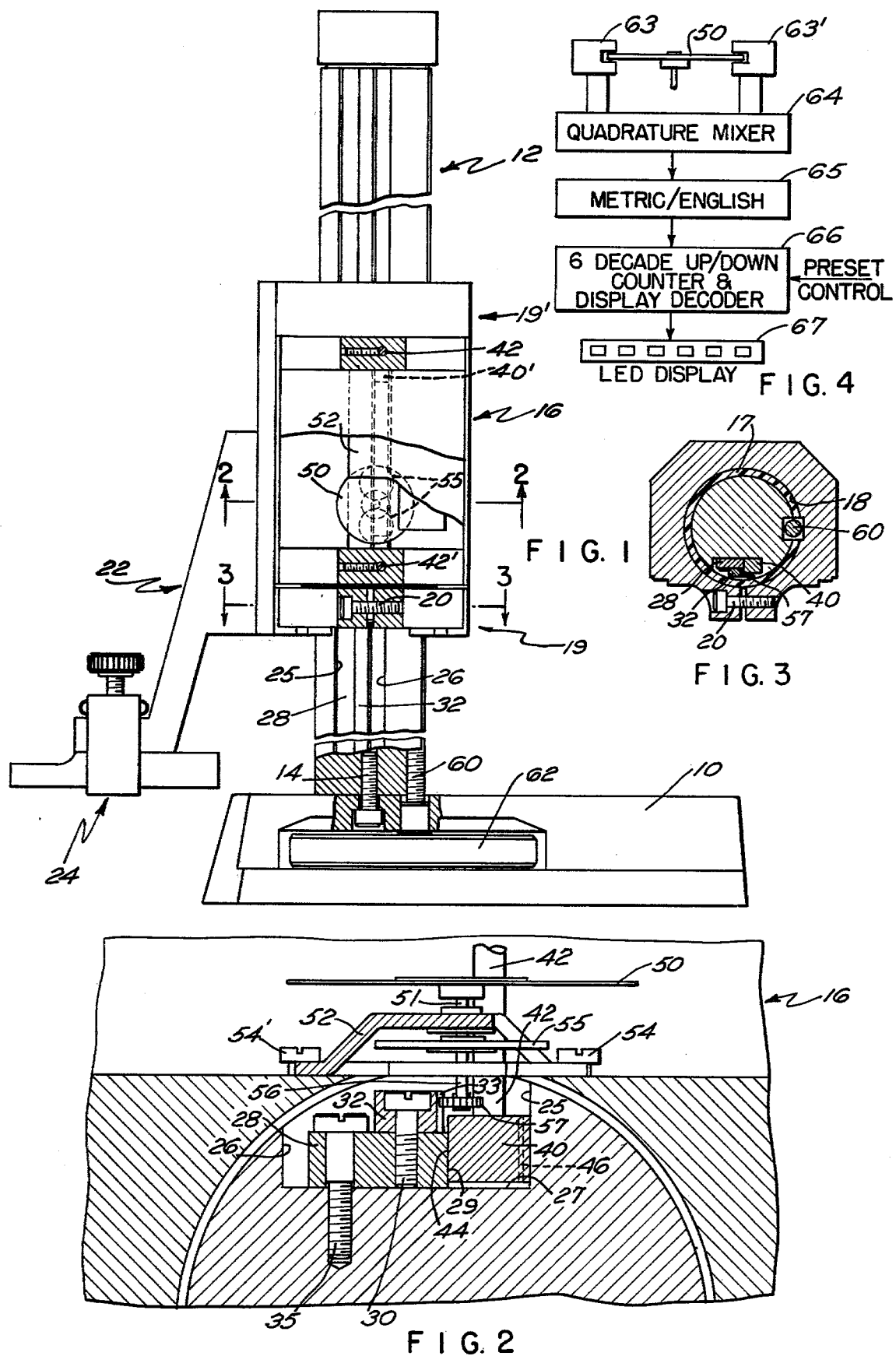

HEIGHT GAGE

BACKGROUND OF THE INVENTION

In the prior art height gages have been in existence for many years and have generally taken the form of a base upon which a rectangular column was mounted and a carriage was slidably engaged with the vertical column. For the purpose of measurement the column has been provided with graduations and usually have included a vernier arrangement so that the accuracy of the gage could be improved. A typical example of the configuration of this type of height gage which are typically illustrated as, for example, in the Gerber U.S. Pat. No. 2,465,530. As will be appreciated by those in the art, it has, in the past, always been necessary to adjust this type of height gage by rough and vernier adjustments and then by reading these rough and vernier adjustments on precision scales. In use, of course, a reference heading is generally first recorded and then a second reading is made and also recorded with a subtraction operation occurring if the differential between the two measured heights is desired.

Some suggestions have been made in the prior art for improving on this arrangement as, for example, in Taylor U.S. Pat. No. 3,924,337 where a direct readout by the utilization of electronic means has been proposed. Height gages with means for obtaining direct readout of dimensional figures do not appear in the prior art utilizing a circular column mounted on a base. Circular columns, however, have been used in certain types of devices as mounting means for other measuring devices and have always been used where it has been desirable to provide swiveling of the carriage on the column. For gaging purposes, however, this is not a desirable result and the present invention relates to an arrangement where a height gage is mounted on a circular column with means for generating height or distance information.

SUMMARY OF THE INVENTION

The height gage of the present invention has as its primary unit a circular column that extends vertically from a base with a carriage that is mounted on the column to be movable therealong and is guided for accurate movement up and down the column by providing a longitudinal groove therein having at least one surface that extends on a cord of the circular column when the same would be viewed in cross section together with a guiding member that has a very accurate surface thereon that extends throughout the length of the column on a radius of the column which guiding member is mounted in the groove. The carriage is provided with a shoe that bears against the accurate longitudinal surface of the guiding member and then in a preferred form has a resilient means that engages the surface of the groove to press the shoe against the accurate guiding member surface. In this fashion the carriage is accurately guided up and down the column and means can therefore be provided between the column and the carriage for measurement. In its simplest form the measurement system may consist of a fixed scale having, for example, twenty-five lines per millimeter which operates in conjunction with a photoelectric reading head, the latter being mounted on the carriage. As known to those skilled in the art, a series of signals proportional to the distance moved may be electronically processed and operate a counter with digital display. In another form the measuring system consists of a precision rack mounted in the groove of the column with an optical encoder mounted on a shaft that has a gear that engages the rack so that as rotation of the encoder takes place electrical signals are generated to provide a direct electronic readout. Devices of the first mentioned type are illustrated as, for example, in the Weber U.S. Pat. No. 4,037,325 while devices of the latter type are illustrated in the aforementioned U.S. Pat. No. 3,924,337.

BRIEF DESCRIPTION OF THE DRAWINGS

FIG. 1 is a fragmentary partly in section elevational view of a height gage constructed in accordance with the invention;

FIG. 2 is a fragmentary sectional view taken substantially on lines 2—2 of FIG. 1 illustrating the manner in which the carriage is guided and a suitable measurement readout obtained;

FIG. 3 is a cross sectional view taken on line 3—3 of FIG. 1;

FIG. 4 is a block diagram of the electronics for the height gage.

DETAILED DESCRIPTION OF THE PREFERRED EMBODIMENT

The height gage shown in the drawings includes a base 10 which is generally a rather heavy casting that has a relatively large mass to support a vertical column generally designated 12 thereon. The vertical column is of circular cross section (as seen in FIG. 2) and may be attached to the base by one or more attaching screws such as 14. A carriage generally designated 16 is provided with upper and lower split plastic bushings 17 such as made from P.T.F.E. (see FIG. 3) that are received in counterbores 18 and encircle the column in a split to provide proper guiding movement with a lack of sloppiness and yet sufficiently close to provide the required accuracy. The illustration in FIG. 3 is purely for explanatory purposes and is not to be considered to scale. The guiding bushings such as 17 may conveniently be located at two extremes of the carriage as, for example, the locations designated generally 19 and 19' on FIG. 1 and it will therefore be appreciated that good stability of the carriage in its up and down movement on the column can be readily achieved. Conveniently the split bushings 17 may be provided with adjustment means to obtain optimum clearance with the column, the adjustment means taking the form of clamp adjusting screws such as 20 as seen in FIG. 3 of the drawings that draw the plastic bushings about the column 12. Carriage 16 also carries a measurement probe generally designated 22 which is suitably secured thereto for movement therewith up and down the column and can be provided, as well known to those skilled in the art, with any number of accessory devices that can be conveniently clamped thereto by the fixturing as seen generally at 24.

The column 12, as has been briefly alluded to, is circular in cross section and is provided with a longitudinal groove which conveniently may be milled therein so as to provide a pair of walls 25, 26 that extend on parallel chords as seen in cross section and a bottom wall 27 extending on substantially a perpendicular chord. Mounted on the bottom wall 27 is a guiding block 28 which has an accurately ground surface 29 extending the length thereof. The guiding member 28 is accurately positioned in the groove so that the surface 29 extends on a radius of the cross section of the column. To achieve this, a positioning block is placed in the groove and the studs 35 will be inserted to hold the member 28 in place. In practice a rack 32 which has teeth at 33 and which will convey dimensional information is first attached to the block 28 by screws 30, the tooth line of the rack being also accurately controlled relative to the surface 29. Once the assembly has been accurately positioned, a number of holes may be drilled therein and locating drift pins (not shown) may be positioned to hold the assembly in place.

The carriage 16 has mounted thereon at least a pair of shoes 40, 40' which are secured to the carriage by mounting studs 42, 42'. To accommodate drilling tolerance, at least one stud may be eccentric. Accordingly, if there is any variation in the holes in the carriage 16, the adjustment of an eccentric stud will not cause distortion of the assembly. Each shoe has a ground surface 44 that engages the surface 29 and the opposite side thereof is recessed to receive an elongated curved spring 46 that bears against the wall 25. This arrangement effects proper guiding movement of the carriage 16 up and down the column.

To provide for a readout of the position of the carriage on the column, there is illustrated an encoder disc 50 mounted on a shaft 51 that is supported in a bracket 52 that is secured to the carriage by bolts 54, 54'. Shaft 51 may be coupled by suitable gearing 55 to shaft 56 which in turn has mounted thereon a gear 57 that engages the rack teeth 33.

As known to those skilled in the art, as the encoder 50 turns in one direction or the other, it will generate electric pulses by utilizing an arrangement as, for example, is illustrated in British Pat. No. 1,375,824. As disclosed in this patent the pulses that are generated with the up-down circuit may be appropriately counted so as to cause a particular display to be generated. Alternately, a Moire fringe measurement system as disclosed in U.S. Pat. No. 4,037,325 could be utilized in which case, in lieu of the rack 32, a scale would be fixedly attached in the groove with suitable reading circuitry mounted on the carriage 16.

In FIG. 4 there is shown a specific way of accomplishing a digital readout of the position of the carriage 16. As will be apparent, when the carriage moves up and down the column, the encoder 50 turns in one direction or the other and has associated therewith a pair of sensors 63 and 63', each of which includes a light source and a photoelectric detector spaced therefrom. Since it is desired to produce two pulse trains that are 90° out of phase with each other, the two sensors 63 and 63' are set relative to the apertures in the disc 50 to achieve this result by means well known to those skilled in the art. The pulses from the sensors 63 and 63' are then fed to a quadrature mixer 64 where the leading and trailing edges of the pulses are differentiated. The direction of motion of the carriage 16 is determined by whether the pulses from sensors 63 lead or lag pulses from sensor 63' and the appropriate pulse is then gated to the output of mixer 64. The output of the quadrature mixer then is fed to a Metric/English converter 65. Basically, each pulse that is incoming corresponds to a unit increment in the Metric mode. Effectively, therefore, to convert to the English mode this means either conducting or inhibiting a pulse to the decade counter stages. A two-digit hexadecimal pointer counter is monitored, and the input pulse from the encoder is inhibited at 27 out of 127 pointer states. The output of the Metric/English converter 65 then is fed to a sixth decade up/down counter 66 which may conveniently be a Mostek 50396. This unit has a clear input or preset control which will reset all decades to zero when brought high and has seven segment outputs which will drive an LED display 67.

As is usual in devices of this nature, in order to move the carriage 16 along the height gage, a lead screw 60 extends the length of the column and is attached to a wheel 62 that is available for rotation through an aperture in the base 10. Clamp means in the form of a split half thread may removably engage the lead screw 60 to the carriage 16 so that fast movement of the carriage can be achieved as is well known to those versed in the measurement art.

The invention, therefore, provides an improved height gage that may make measurements quickly and accurately in a simple structure and by the utilization of electronic circuitry can provide height measurements on a direct basis. It can be visually read.

I claim:

1. A height gage comprising a base, a vertical circular column mounted on said base, a carriage movable on said column, said column having a longitudinal groove therein with at least one surface extending on a chord of said column, a second surface on a radius of said column in said groove, shoe means on said carriage engaging the second surface, resilient means on said shoe engaging said one surface of said groove, means coupled between said column and said carriage for generating an electrical signal as a function of distance and displaying the information.

2. A height gage as in claim 1 wherein said second surface is formed by a longitudinal guiding member mounted in said groove.

3. A height gage as in claim 1 wherein guiding means are mounted on said carriage and embrace said column.

4. A height gage as in claim 3 wherein said guiding means are mounted in spaced relation on said carriage.

5. A height gage as in claim 1 wherein a rack is mounted in said groove and a rotary encoder is mounted on said carriage, means coupling the encoder to said rack.

6. A height gage as in claim 5 wherein said encoder has means associated therewith to generate electric signals and means for converting said electric signals to dimensional units displayed in digital format.

7. A height gage comprising a base, a vertical circular column mounted on said base, a carriage movable on said column, said column having a longitudinal groove therein with at least one surface extending on a chord of said column, a longitudinal guiding member having a surface on a radius of said column mounted in said groove, shoe means on said carriage engaging the guiding member, resilient means on said shoe engaging said surface of said groove, a rack mounted in said groove, an encoder mounted on said carriage including a shaft having a gear engaging said rack, and an electronic display means coupled to said encoder.

* * * * *